United States Patent
Buehman et al.

(10) Patent No.: US 7,197,879 B2
(45) Date of Patent: Apr. 3, 2007

(54) MULTIPLE ELECTRIC FUEL METERING SYSTEMS FOR GAS TURBINE APPLICATIONS

(75) Inventors: Guerry Buehman, Chandler, AZ (US); Bruce Anson, Scottsdale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 357 days.

(21) Appl. No.: 10/836,017

(22) Filed: Apr. 29, 2004

(65) Prior Publication Data

US 2005/0241318 A1    Nov. 3, 2005

(51) Int. Cl.
*F02C 7/232* (2006.01)
*F02C 9/26* (2006.01)

(52) U.S. Cl. .................. 60/773; 60/39.094; 60/39.281; 60/739

(58) Field of Classification Search ............. 60/39.094, 60/39.281, 772, 773, 734, 739
See application file for complete search history.

(56) References Cited

U.S. PATENT DOCUMENTS

| | | | |
|---|---|---|---|
| 2,617,478 A | 11/1952 | Hildestad | |
| 2,725,932 A | 12/1955 | Ballantyne et al. | |
| 2,808,699 A | 10/1957 | Ivens et al. | |
| 3,056,259 A | 10/1962 | Jubb | |
| 4,027,473 A | 6/1977 | Baker | |
| 4,441,156 A | 4/1984 | Barbeau | |
| 4,729,218 A | 3/1988 | Haselbauer et al. | |
| 4,815,278 A | 3/1989 | White | |
| 4,903,478 A | 2/1990 | Seto et al. | |
| 5,024,055 A | 6/1991 | Sato et al. | |
| 5,036,657 A | 8/1991 | Seto et al. | |
| 6,405,524 B1* | 6/2002 | Mistry et al. | .................. 60/739 |
| 6,836,086 B1* | 12/2004 | Goldberg et al. | ........... 318/445 |
| 2002/0038540 A1* | 4/2002 | Griffiths et al. | .......... 60/39.281 |

* cited by examiner

*Primary Examiner*—L. J. Casaregola
(74) *Attorney, Agent, or Firm*—Ingrassia Fisher & Lorenz

(57) ABSTRACT

The present invention provides a multiple manifold fuel metering system with a separate motor, pump, and shut-off/purge valve for each manifold. The present invention may be used for metering fuel to any engine, especially a gas turbine engine. The fuel metering system of the present invention has the capability of independently controlling fuel flow during transitions in engine operation or allowing fuel to flow simultaneously through all manifolds to prevent blow-out, optimizing combustion temperature distributions, or minimizing combustion emissions. Brushless DC variable speed electric motors may be used to drive pumps with highly accurate speed control to accurately control fuel flow rate to each of a plurality of manifolds of a fuel metering system. With brushless DC motors, motor speed may be controlled within a revolution for smoothing fuel delivery to an engine.

22 Claims, 5 Drawing Sheets

MULTIPLE ELECTRIC FUEL METERING SYSTEMS FOR GAS TURBINE APPLICATIONS

GOVERNMENT RIGHTS

The invention described herein was made in the performance of work under U.S. Army Agreement No. DAAE07-02-3-0002, dated Apr. 25, 2002, and is subject to the provisions of Section 305 of the National Aeronautics and Space Act of 1958 (42 U.S.C. 2457). The Government has certain rights in this invention.

BACKGROUND OF THE INVENTION

This invention relates generally to multiple electric fuel metering systems and, in particular, to a multiple fuel manifold system and method for operating the same.

Attempts have been made to design fuel systems to minimize fuel consumption while maintaining high engine performance. One such attempt is shown in FIG. 1. Fuel metering system 10 may include a fuel supply 30, from which pump 40 may deliver fuel to a manifold 70 for distribution within a gas turbine engine 20. An electric control unit 76 may be used to control operation of a motor 50, which may drive pump 40. Shut-off/purge valve 60 may be operated by the electric control unit 76 or may be pressure operated to provide purge air from the purge air source 46 to the gas turbine engine 20 when fuel flow is not desired. Pressure for operating the shutoff/surge valve may be provided by either the fuel or purge air supply.

One disadvantage of the above approach is the inability of system 10 to operate effectively at low fuel-to-air ratios approaching a lean stability limit, known as the blowout limit, or with high fuel turndown ratios. Under certain conditions, such as when using system 10 during idle descent of an aircraft on a cold day, the combustor of the gas generating portion of the gas turbine engine may experience fuel starvation at one or more fuel injectors. In this situation, the blowout limit may be exceeded, potentially leading to totally extinguishing the combustion process and stopping the engine's operation.

One attempt to prevent this fuel starvation problem is disclosed in U.S. Pat. No. 4,903,478 to Seto, et al. The Seto patent shows a design of a dual manifold fuel system. Fuel flow to both manifolds is controlled by a fuel controller. One of the two manifolds has an off valve interposed between it and the fuel control. One of the disadvantages of the design in the Seto patent is that it does not offer the capability of independently controlling fuel flow during transitions in engine operation or allow fuel to flow simultaneously through both manifolds to prevent blowout, optimizing combustion temperature distributions, or minimizing combustion emissions.

As can be seen, there is a need for an improved system, apparatus, and method for metering fuel in a vehicle fuel system. Furthermore, there is a need for an apparatus and method for delivering fuel to an engine that functions efficiently during engine operation at various power levels and at high fuel turndown ratios. There is a further need for a fuel system for gas turbine applications that maximizes engine operability and results in extended hot-section life and reliability.

SUMMARY OF THE INVENTION

In one aspect of the present invention, a fuel metering system for an engine comprises a first manifold for feeding fuel to the engine; a first pump for pumping fuel to the first manifold; a first motor for operating the first pump; a second manifold for feeding fuel to the engine; a second pump for pumping fuel to the second manifold; and a second motor for operating the second pump.

In a further aspect of the present invention, a fuel metering system for a vehicle comprises a first manifold for feeding fuel to an engine of the vehicle; a first pump for pumping fuel to the first manifold; a first motor for operating the first pump; a first shut-off/purge valve for allowing or preventing the flow of fuel from the first pump to the first manifold; a second manifold for feeding fuel to the engine; a second pump for pumping fuel to the second manifold; a second motor for operating the second pump; and a second shut-off/purge valve for allowing or preventing the flow of fuel from the second pump to the second manifold.

In another aspect of the present invention, a fuel metering system for an engine of a vehicle comprises a first manifold for feeding fuel to the engine; a first pump for pumping fuel from a fuel supply to the first manifold; a first motor for operating the first pump; a first shut-off/purge valve for allowing or preventing the flow of fuel from the first pump to the first manifold; a second manifold for feeding fuel to the engine; a second pump for pumping fuel from a fuel supply to the second manifold; a second motor for operating the second pump; a second shut-off/purge valve for allowing or preventing the flow of fuel from the second pump to the second manifold; a purge air source for supplying purge air to the first and second shut-off/purge valves; and an electronic control unit for individually controlling the speed of the first motor and the speed of the second motor. In still another aspect of the present invention, a gas turbine engine comprises a fuel metering system for the gas turbine engine, wherein the fuel metering system comprises a first manifold for feeding fuel to the engine; a first pump for pumping fuel from a fuel supply to the first manifold; a first motor for operating the first pump; a first shut-off/purge valve for allowing or preventing the flow of fuel from the first pump to the first manifold; a second manifold for feeding fuel to the engine; a second pump for pumping fuel from a fuel supply to the second manifold; a second motor for operating the second pump; a second shut-off/purge valve for allowing or preventing the flow of fuel from the second pump to the second manifold; and an electronic control unit for individually controlling the speed of the first motor and the speed of the second motor.

In yet another aspect of the present invention, a method for metering fuel to an engine comprises pumping fuel from a fuel supply to a first manifold in fluid communication with the engine; pumping fuel from the fuel supply to a second manifold in fluid communication with the engine; feeding fuel from the first manifold to the engine; and feeding fuel from the second manifold to the engine; wherein a first pump and a second pump are driven by a first motor and a second motor, respectively.

In still a further aspect of the present invention, a method of metering fuel in a vehicle comprises pumping fuel, with a first fuel pump, from a fuel supply to a first manifold, wherein the first fuel pump is driven by a first motor; feeding fuel from the first manifold to an engine; allowing the flow of fuel from the first fuel pump to the first manifold by opening a first shut-off/purge valve; pumping fuel, with a second fuel pump, from a fuel supply to a second manifold, wherein the second fuel pump is driven by a second motor; feeding fuel from the second manifold to an engine; allowing or preventing the flow of fuel from the second fuel pump to the second manifold by opening or closing a second shut-off/purge valve; and independently controlling the first motor and the second motor via an electronic control unit. These and other aspects, objects, features and advantages of the present invention, are specifically set forth in, or will become apparent from, the following detailed description of an exemplary embodiment of the invention when read in conjunction with the accompanying drawings.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides a multiple manifold fuel system with a separate motor, pump, and shut-off/ purge valve for each manifold. The present invention may be used for metering fuel to any engine, such as a gas turbine engine. Although the following description will describe the present invention as being used in a ground vehicle, the following description should be understood to be applicable to other suitable uses, such as aircraft and stationary installations to produce power and emergency backup systems. The present invention may be used in industrial and ground-based power plants.

In gas turbine engines having multiple fuel nozzle manifolds and high fuel turndown, engine operability may benefit from having multiple fuel metering systems according to the present invention. This is in contrast to the typical single fuel metering system employed in prior art gas turbine engines. Thus, the present invention differs from the prior art in that each manifold may be independently controlled to meter fuel to the engine. By having separate and independently controlled fuel metering to each fuel nozzle manifold, engine operability can be maximized and the combustor system pattern factor may be minimized, resulting in extended hot-section life and reliability. Because the present invention may provide a multiple manifold fuel system with a separate motor, pump, and a shut-off/purge valve for each manifold, it has several advantages over prior art fuel metering systems. For example, the metering system of the present invention has the capability of independently controlling fuel flow to each manifold during transitions in engine operation, or allowing fuel to flow simultaneously through all manifolds to prevent blowout, optimizing combustion temperature distributions, and minimizing combustion emissions. Brushless DC variable speed electric motors may be used to drive pumps with highly accurate speed control. With brushless DC motors, motor speed may be controlled within a revolution for smoothing fuel delivery to one or more fuel nozzle manifolds of an engine.

Figure 1:
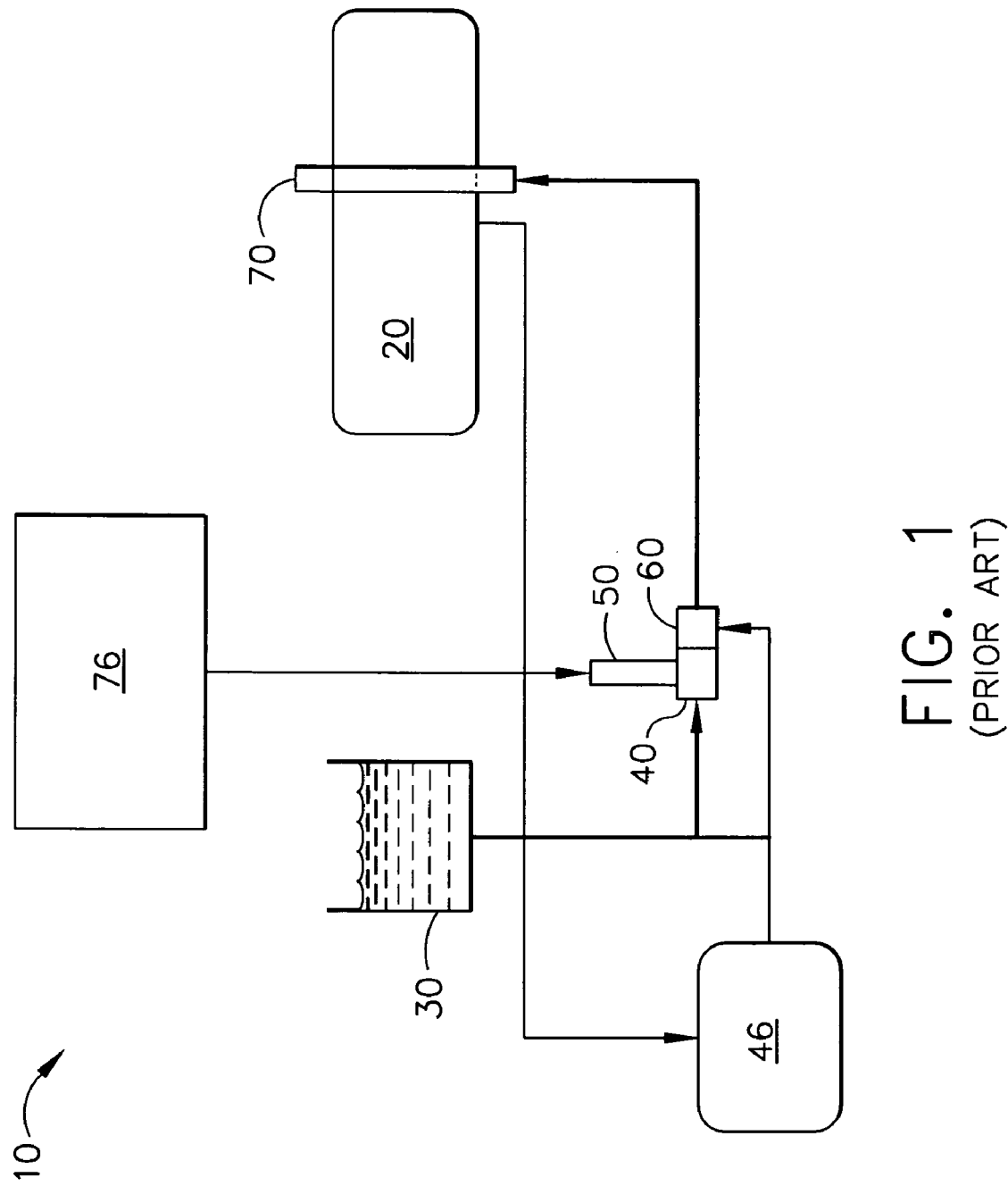
FIG. 1 is a diagram schematically representing a prior art fuel metering system.
Figure 2:
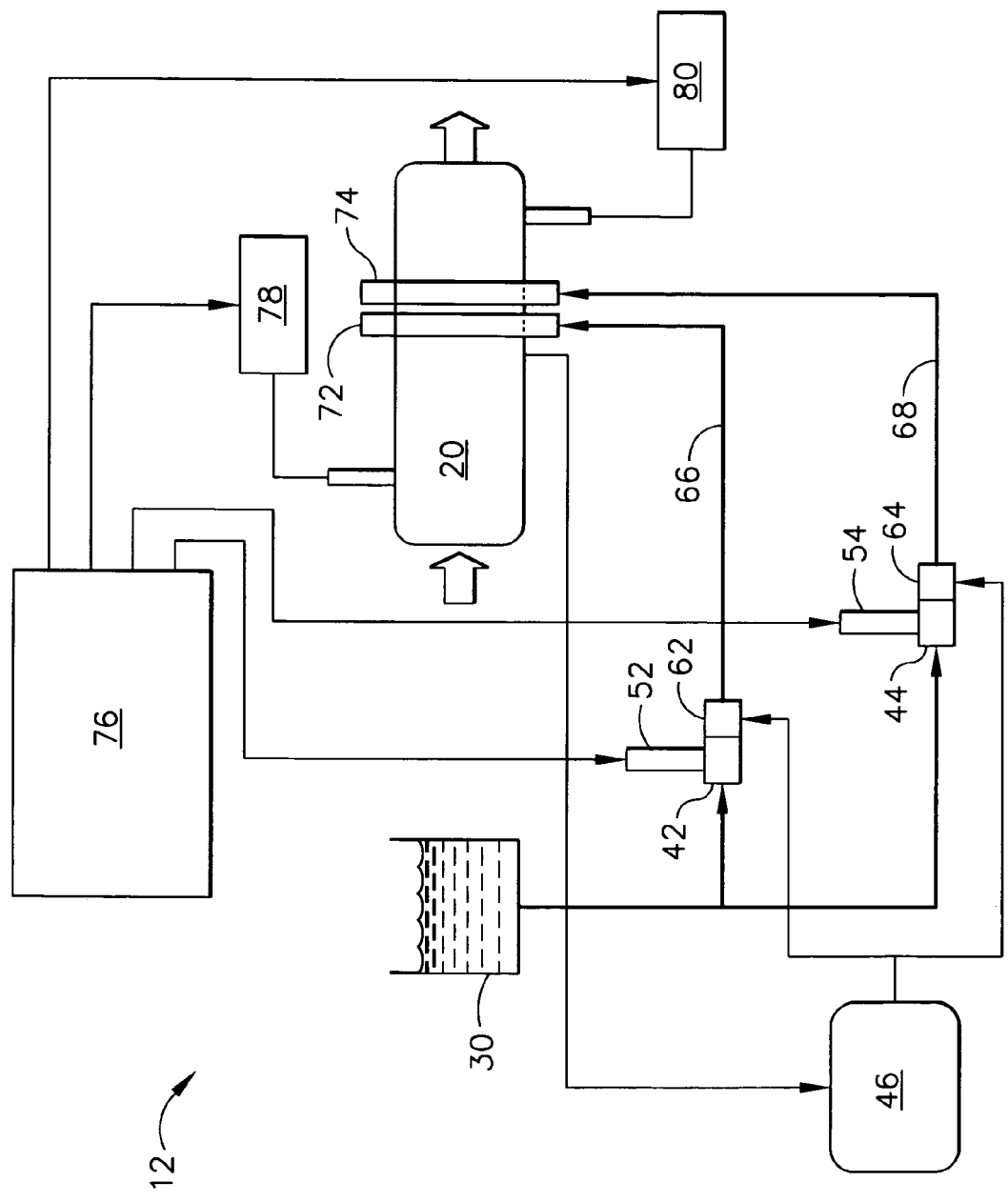
FIG. 2 is a schematic representation of a fuel metering system, according to an embodiment of the present invention.

In more specifically describing the present invention, and as can be appreciated from FIG. 2, the present invention provides a fuel metering system 12 which may be located on board a vehicle, such as a land vehicle, or a flying vehicle, or other vehicles. Fuel from fuel supply 30 may be fed to a gas turbine engine 20. The fuel may be distributed and fed to the gas turbine engine 20 with multiple manifolds 72, 74. Although the following discussion shows the use of two manifolds 72, 74, it should be understood that the present invention may also include three or more manifolds.

In FIG. 2, fuel from the fuel supply 30 may be sent to a first manifold 72 and a second manifold 74. Fuel may be pumped to the first manifold 72 by a first pump 42. Fuel may also be pumped to the second manifold 74 by a second pump 44. For example, depending on the engine operating conditions or engine power requirements, both of the first pump 42 and the second pump 44 may be operated; and, the first pump 42 may be operated while the second pump may be idle.

The first pump 42 and the second pump 44 may be driven, respectively, by first motor 52 and second motor 54. The fuel flow rate may be controlled by motor speed, wherein the speed of the first motor 52 and the speed of the second motor 54 can be independently controlled by an electronic control unit 76. If needed, fuel to the gas turbine engine 20 may be started or stopped by starting or stopping the pumps 42 and 44 and opening or closing a first shut-off/purge valve 62 and/or a second shut-off/purge valve 64 depending on the need for fuel flow or purge air to the manifolds 72 and 74. A first shut-off/purge valve 62 may be used for allowing or preventing the flow of fuel from the first pump 42 to the first manifold 72 while preventing or allowing purge air, by opening or closing first shut-off/purge valve 62. Likewise, a second shut-off/purge valve 64 may be used for allowing or preventing the flow of fuel from the second pump 44 to the second manifold 74, by opening or closing second shut-off/ purge valve 64.

First shut-off/purge valve 62 may be disposed in fluid communication with the first pump 42 and with the first manifold 72. Similarly, the second shut-off/purge valve 64 may be disposed in fluid communication with the second pump 44 and with the second manifold 74. The first and second shut-off/purge valves 62, 64 may be operated independently of each other by opening or closing first and second shut-off/purge valves 62, 64 when needed, as may be determined by the electronic control unit 76. The first and second shut-off/purge valves 62, 64 may be operated by the electronic control unit 76 or be pressure operated and provide purge air from the purge air source 46, which may be received from the gas turbine engine 20 to the fuel manifolds 72, 74 when fuel is not commanded. Fuel may be delivered, through a first fuel line 66 and a second fuel line 68, from the first and second pumps 42, 44 to the first and second manifolds 72, 74, respectively.

As shown in FIG. 2, an electronic control unit 76 may be used to control fuel delivery and gas flows within the gas turbine engine 20. For example, the speed and rotational direction of first and second motors 52, 54 may be independently controlled by the electronic control unit 76 to meter fuel pumping to independently control the fuel delivered to the first and second manifolds 72, 74. Electronic control units for metering fuel are well known in the art for fuel systems. Depending on operating conditions of the engine 20, the speed of the first pump 42 can be controlled by controlling the speed of the first motor 52 which may drive the first pump 42, while the second pump 44 may be idle. Under other operating conditions, the speed of both the first and second pumps 42, 44 may be independently controlled by selecting different (or same) speeds for each of the first motor 52 and the second motor 54.

According to one aspect of the invention, under certain engine operating conditions, for example, at low power levels a single pump, for example pump 42, with speed commanded by the electronic control unit 76, may supply fuel to one manifold, for example first manifold 72, for engine 20 startup and idle operation. This may ensure adequate fuel atomization at low fuel flow conditions. If engine power demand increases above engine startup and idle operation, the second pump 44 may be brought on-line after operating only the first pump 42. Any transients caused by manifold fill time can be accounted for with temporary changes in pump speed. At this time, the fuel output from the first and second pumps 42, 44 may be equalized, as an example. Thereafter, as long as the total fuel flow remains above some pre-determined level, both first and second pumps 42, 44 may operate identically. As load decreases below some pre-determined level, one of the pumps, for example second pump 44, may be stopped, and operation continues on the remaining pump, for example first pump 42.

A guide vane actuator 78, as well known in the art, may also be controlled by the electronic control unit 76 for controlling airflow into the gas turbine engine 20. A variable area turbine nozzle 80, as well known in the art, may also be controlled by the electronic control unit 76 for controlling gas flow into the power turbine 20.

The first motor 52 and the second motor 54 may be electric motors. The first motor 52 and the second motor 54 may be variable speed motors and, as an example, may be variable speed DC brushless electric motors. When using brushless DC motors, motor speeds of the first motor 52 and the second motor 54 may be independently controlled such that motor speed can be re-set within the period of time required for a single revolution of the first motor 52 or the second motor 54 for smoothing fuel delivery to the engine 20. Using the electronic control unit 76 to control the first and second motors 52, 54 may set the rate of feeding fuel to the gas turbine engine 20 to be a variable rate according to the speed of the first and second motors 52, 54. The first pump 42 and the second pump 44 may be fixed-displacement fuel pumps, which are well known in the art.

Figure 3:
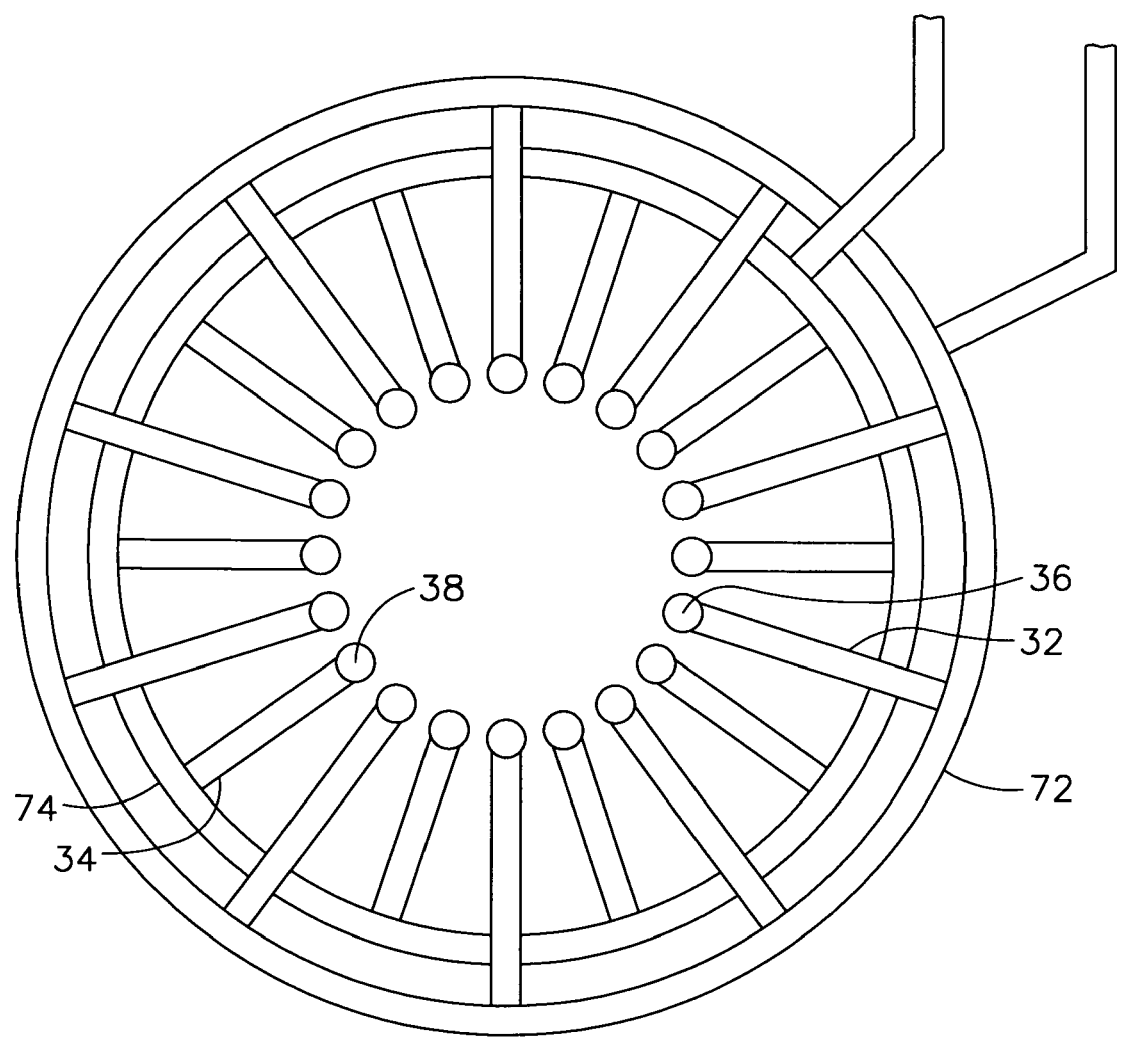
FIG. 3 is a diagrammatic end view of the manifolds in a fuel metering system, according to an embodiment of the present invention.

With reference to FIG. 3, an embodiment of the present invention including the first manifold 72 and the second manifold 74 is shown. Fuel may be metered independently to first and second manifolds 72, 74 via control of the first motor 52 and the second motor 54, respectively, as described hereinabove with reference to FIG. 2. The first manifold 72 may comprise a first plurality of nozzle lines 32 for sending fuel to a first plurality of injector nozzles 36. The second manifold 74 may be disposed adjacent to the first manifold 72 such that fuel from the second manifold 74 may be injected at about the same location as fuel from the first manifold 72 is injected. The second manifold 74 may comprise a second plurality of nozzle lines 34 for sending fuel to a second plurality of injector nozzles 38.

Figure 4:
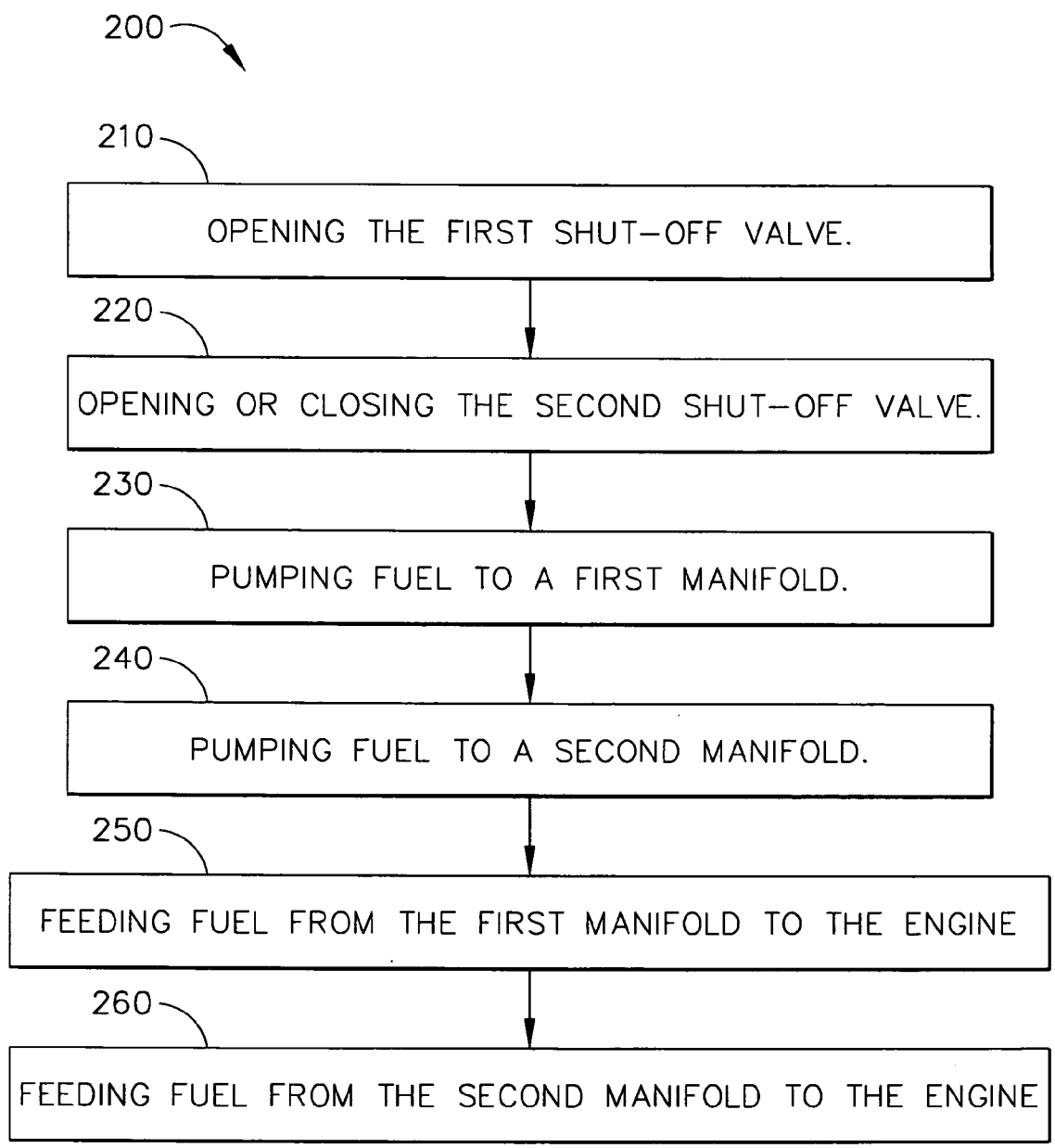
FIG. 4 is a flow chart schematically representing steps of a method for metering fuel, according to an embodiment of the present invention.

With reference to FIG. 4, a method 200 for metering fuel, according to yet another embodiment of the present invention, is described. Method 200 may comprise a step 210 of pumping fuel from the fuel supply 30 to the first manifold 72, which may be in fluid communication with the engine 20. Another step 220 may comprise opening or closing the second shut-off/purge valve 64 to allow or prevent fuel flow and prevent or allow purge air within the second fuel line 68. Additionally, method 200 may further comprise controlling the flow of fuel from the first pump 42 to the first manifold 72 and/or controlling the flow of fuel from the second pump 44 to the second manifold 74. The flow of fuel from the first pump 42 to the first manifold 72, and the flow of fuel from the second pump 44 to the second manifold 74 may be independently controlled by controlling the respective speeds of the first motor 52 and the second motor 54, respectively. A step 230 may comprise opening or closing the first shut-off/purge valve 62 to allow or prevent fuel to flow and prevent or allow purge air within first fuel line 66. Step 240 may comprise pumping fuel from the fuel supply 30 to the second manifold 74, which may be in fluid communication with the engine 20. A step 250 may comprise feeding fuel from the first manifold 72 to the engine 20. Likewise, a step 260 may comprise feeding fuel from the second manifold 74 to the engine 20. Optionally, the first pump 42 and the second pump 44 may be driven by first and second motors 52, 54, wherein first and second motors 52, 54 may comprise variable speed brushless electric motors. The fuel flow rate may be controlled by the speed of the first motor 52 and the speed of the second motor 54. The rate of feeding fuel to the engine 20 may be a variable rate according to the speed of the first and second motors 52, 54. The rate of feeding fuel to the first and second manifolds 72, 74 from the first and second motors 52, 54, respectively, may be independently controlled via the electronic control unit 76. The first pump 42 and the second pump 44 may be fixed-displacement fuel pumps.

Figure 5:
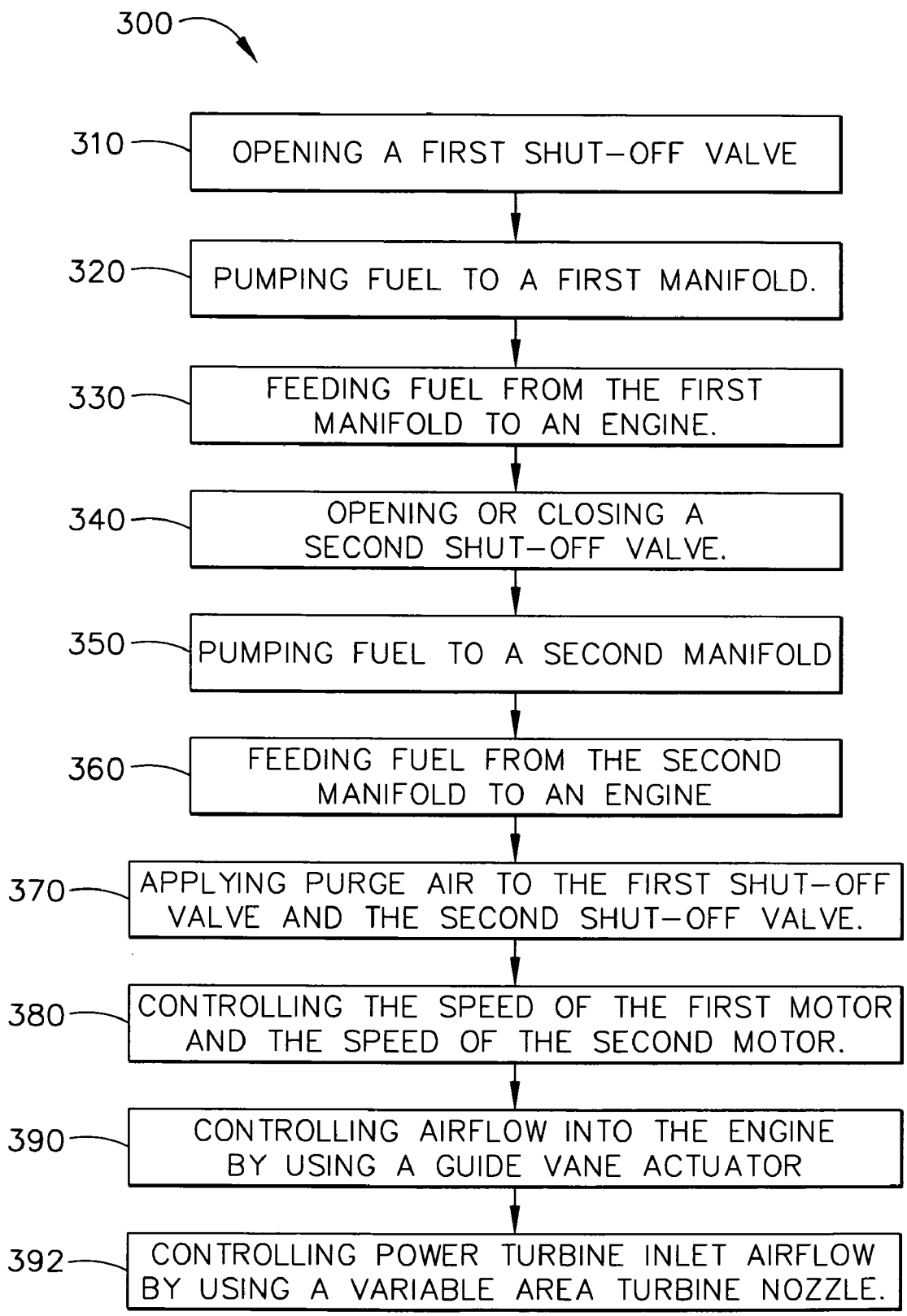
FIG. 5 is a flow chart schematically representing steps of a method for metering fuel, according to another embodiment of the present invention.

With reference to FIGS. 5, a method 300 for metering fuel in a vehicle, such as a land vehicle, or a flying vehicle, or other vehicles, according to still another embodiment of the present invention, is described. Method 300 may comprise Method 300 may continue with a step 320 of pumping fuel, with the first pump 42, from the fuel supply 30 to the first manifold 72. Thereafter, a step 330 may comprise feeding fuel from the first manifold 72 to the engine 20. A step 340 may involve allowing or preventing the flow of fuel from the second fuel pump 44 to the second manifold 74 by opening or closing the second shut-off/purge valve 64. Step 350 may involve pumping fuel, with the second fuel pump 44, from the fuel supply 30 to the second manifold 74; and a step 360 may comprise feeding fuel from the second manifold 74 to the engine 20. The fuel flow rate to the first and second manifolds 72, 74 may be controlled by controlling the speed of the first motor 52 and the speed of the second motor 54, as described hereinabove.

Depending on operating conditions of the engine 20, the speed of the first pump 42 may be controlled by controlling the speed of the first motor 52, which may drive the first pump 42, while the second motor 54 and the second pump 44 may be idle. Under other operating conditions, the speed of both the first and second pumps 42, 44 may be independently controlled by selecting different (or the same) speeds for each of first motor 52 and second motor 54. According to one aspect of the invention, under certain engine operating conditions, for example, at low power levels a single pump, for example pump 42, with speed commanded by the electronic control unit 76, may supply fuel to one manifold, for example first manifold 72, for engine startup and idle operation. This may ensure adequate fuel atomization at low fuel flow conditions. If the engine power demand increases above engine startup and idle operation, the second pump 44 may be brought on-line after operating only the first pump 42.

Thereafter, a step 370 may comprise operating the first shut-off/purge valve 62 and/or the second shut-off/purge valve 64 which may be pressure operated or by supplying a command from the electronic control unit 76. A step 380 may comprise controlling speed of the first motor 52 and/or the speed of the second motor 54 with the electronic control unit 76. Method 300 may continue with a step 390, which may comprise controlling airflow into the engine 20 by using a guide vane actuator 78. A further step 392 may comprise controlling power turbine inlet airflow in the engine 20 by using a variable area turbine nozzle 80. The first motor 52 and the second motor 54 may be variable speed brushless electric motors.

It should be understood, of course, that the foregoing relates to exemplary embodiments of the invention and that modifications may be made without departing from the spirit and scope of the invention as set forth in the following claims.

We claim:

1. A fuel metering system for an engine, comprising:
a first manifold for feeding fuel to the engine;
a first pump for pumping fuel to the first manifold;
a first motor for operating the first pump;
a second manifold for feeding fuel to the engine;
a second pump for pumping fuel to the second manifold;
a second motor for operating the second pump; and
a first shut-off/purge valve for allowing or preventing the flow of fuel from the first pump to the first manifold and preventing or allowing the flow of purge air from the first pump to the first manifold.

2. The fuel metering system of claim 1, wherein the first manifold comprises a plurality of injector nozzles.

3. The fuel metering system of claim 1, further comprising an electronic control unit for controlling the first motor.

4. The fuel metering system of claim 3, wherein the first shut-off/purge valve is operated by the electronic control unit.

5. The fuel metering system of claim 1, wherein the first shut-off/purge valve is pressure-operated.

6. A fuel metering system for vehicle, comprising:
a first manifold for feeding fuel to an engine of the vehicle;
a first pump for pumping fuel to the first manifold;
a first motor for operating the first pump;
a first shut-off/purge valve for allowing or preventing the flow of fuel from the first pump to the first manifold and preventing or allowing the flow of purge air from the first pump to the first manifold;
a second manifold for feeding fuel to the engine;
a second pump for pumping fuel to the second manifold;
a second motor for operating the second pump; and
a second shut-off/purge valve for allowing or preventing the flow of fuel from the second pump to the second manifold and preventing or allowing the flow of purge air from the second pump to the second manifold.

7. The fuel metering system of claim 6, further comprising an electronic control unit for controlling the speed of the first motor.

8. The fuel metering system of claim 7, wherein the electronic control unit controls the speed of the second motor.

9. The fuel metering system of claim 6, wherein the first manifold comprises a plurality of injector nozzles.

10. The fuel metering system of claim 6, wherein the first motor and the second motor are electric motors.

11. The fuel metering system of claim 10, wherein the first motor and the second motors are variable speed brushless DC motors.

12. The fuel metering system of claim 6, wherein the first pump and the second pump are fixed-displacement fuel pumps.

13. A fuel metering system for an engine of a vehicle, comprising:
a first manifold for feeding fuel to the engine;
a first pump for pumping fuel from a fuel supply to the first manifold;
a first motor for operating the first pump;
a first shut-off/purge valve for allowing or preventing the flow of fuel and preventing or allowing purge air from the first pump to the first manifold;
a second manifold for feeding fuel to the engine;
a second pump for pumping fuel from a fuel supply to the second manifold;
a second motor for operating the second pump;
a second shut-off/purge valve for allowing or preventing the flow of fuel and preventing or allowing purge air from the second pump to the second manifold;
a purge air source for supplying purge air to the first shut-off/purge valve and the second shut-off/purge valve; and
an electronic control unit for controlling the speed of the first motor and the speed of the second motor.

14. The fuel metering system of claim 13, wherein the first motor and the second motors are electric motors.

15. The fuel metering system of claim 13, wherein the first manifold comprises a first plurality of injector nozzles.

16. The fuel metering system of claim 15, wherein the second manifold comprises a second plurality of injector nozzles.

17. The fuel metering system of claim 13, wherein the speed of the first pump and the speed of the second pump are independently controlled by the electronic control unit.

18. A gas turbine engine, comprising:
a fuel metering system for the gas turbine engine, wherein the fuel metering system comprises:
a first manifold for feeding fuel to the engine;
a first pump for pumping fuel from a fuel supply to the first manifold;
a first motor for operating the first pump;
a first shut-off/purge valve for allowing or preventing the flow of fuel from the first pump to the first manifold;
a second manifold for feeding fuel to the engine;
a second pump for pumping fuel from a fuel supply to the second manifold;
a second motor for operating the second pump;
a second shut-off/purge valve for allowing or preventing the flow of fuel from the second pump to the second manifold; and
an electronic control unit for controlling the speed of the first motor and the speed of the second motor.

19. The fuel system of claim 18, wherein the speed of the first motor and the speed of the second motor are separately controllable.

20. The fuel system of claim 18, wherein the first manifold comprises a first plurality of injector nozzles and the second manifold comprises a second plurality of injector nozzles.

21. A method of metering fuel in a vehicle, comprising:
pumping fuel, with a first fuel pump, from a fuel supply to a first manifold, wherein the first fuel pump is driven by a first motor;
feeding fuel from the first manifold to an engine;
blocking the flow of purge air from the first fuel pump to the first manifold by opening a first shut-off/purge valve;
allowing or preventing the flow of fuel and preventing or allowing purge air from a second fuel pump to a second manifold by opening or closing a second shut-off/purge valve;
feeding fuel from the second manifold to an engine;
pumping fuel, with the second fuel pump, from a fuel supply to the second manifold, wherein the second fuel pump is driven by a second motor; and
independently controlling the first motor and the second motor via an electronic control unit.

22. The method of claim 21, wherein the first motor and the second motor are variable speed brushless electric motors.

* * * * *